US011831772B2

(12) United States Patent
Zeng et al.

(10) Patent No.: US 11,831,772 B2
(45) Date of Patent: Nov. 28, 2023

(54) BLOCKCHAIN MULTI-PARTY SHARED-GOVERNANCE-BASED SYSTEM FOR MAINTAINING DOMAIN NAME INFORMATION

(71) Applicant: CHINA INTERNET NETWORK INFORMATION CENTER, Beijing (CN)

(72) Inventors: Yu Zeng, Beijing (CN); Hongtao Li, Beijing (CN); Anlei Hu, Beijing (CN); Zhiwei Yan, Beijing (CN); Yanfeng Wang, Beijing (CN); Douxuan Nan, Beijing (CN)

(73) Assignee: CHINA INTERNET NETWORK INFORMATION CENTER, Beijing (CN)

( * ) Notice: Subject to any disclaimer, the term of this patent is extended or adjusted under 35 U.S.C. 154(b) by 194 days.

(21) Appl. No.: 17/252,844

(22) PCT Filed: Feb. 28, 2019

(86) PCT No.: PCT/CN2019/076445
§ 371 (c)(1),
(2) Date: Dec. 16, 2020

(87) PCT Pub. No.: WO2020/172843
PCT Pub. Date: Sep. 3, 2020

(65) Prior Publication Data
US 2021/0135867 A1 May 6, 2021

(30) Foreign Application Priority Data
Feb. 20, 2019 (CN) .......................... 201910130953.2

(51) Int. Cl.
*H04L 9/32* (2006.01)
*H04L 9/40* (2022.01)

(52) U.S. Cl.
CPC ............ *H04L 9/32* (2013.01); *H04L 63/1416* (2013.01)

(58) Field of Classification Search
CPC .............................. H04L 9/32; H04L 63/1416
See application file for complete search history.

(56) References Cited

U.S. PATENT DOCUMENTS 9,477,551 B1 * 10/2016 Piszczek ............... G06F 3/0685
10,178,069 B2    1/2019  Li et al.
(Continued)

FOREIGN PATENT DOCUMENTS

CN      108124502 A      6/2018
CN      108389045 A      8/2018
(Continued)

OTHER PUBLICATIONS

International Search Report dated Nov. 18, 2019 of PCT Application No. PCT/CN2019/076445 in 4 pages.

*Primary Examiner* — Lynn D Feild
*Assistant Examiner* — Vladimir I Gavrilenko
(74) *Attorney, Agent, or Firm* — Knobbe, Martens, Olson & Bear, LLP (57) ABSTRACT

Provided by embodiments of the present application is a blockchain multi-party shared-governance-based system for maintaining domain name information, wherein a Root blockchain is formed by first network nodes where respective top-level domain registries are located, and domain name operation information needs to be confirmed by authoritative nodes among the first network nodes after a consensus process. Since the authoritative node is generated by means of voting by each first network node, each network node in the Root blockchain in the system participates in the consensus process for the domain name operation information. Through such a decentralized method for maintaining domain name information, the final state will not be affected (Continued)

by a mistake or an attack on one network node, resulting in higher security and better stability of the entire system compared to the centralized maintenance method. Furthermore, all the domain name operation information is stored in each first network node in the Root blockchain to prevent malicious tampering, and a reliable data source is provided for update of domain name.

9 Claims, 3 Drawing Sheets

(56) References Cited

U.S. PATENT DOCUMENTS

| | | | |
|---|---|---|---|
| 10,230,526 B2 | 3/2019 | Manning | |
| 2016/0191243 A1 | 6/2016 | Manning | |
| 2017/0243177 A1* | 8/2017 | Johnsrud | G06Q 20/10 |
| 2018/0287997 A1 | 10/2018 | Li et al. | |
| 2019/0166085 A1* | 5/2019 | Li | H04L 9/0618 |
| 2019/0319938 A1* | 10/2019 | Castinado | H04L 9/0637 |

FOREIGN PATENT DOCUMENTS

| | | |
|---|---|---|
| CN | 108429765 A | 8/2018 |
| CN | 108833603 A | 11/2018 |

\* cited by examiner

BLOCKCHAIN MULTI-PARTY SHARED-GOVERNANCE-BASED SYSTEM FOR MAINTAINING DOMAIN NAME INFORMATION

CROSS-REFERENCE TO RELATED APPLICATION

The present application is the U.S. National Phase Application under 35 U.S.C. § 371 of International Application No. PCT/CN2019/076445, filed Feb. 28, 2019, designating the U.S. and published as WO 2020/172843 on Sep. 3, 2020, which claims priority to Chinese Application No. 201910130953.2 filed on Feb. 20, 2019, entitled "BLOCKCHAIN MULTI-PARTY SHARED-GOVERNANCE-BASED SYSTEM FOR MAINTAINING DOMAIN NAME INFORMATION", which is incorporated herein by reference in its entirety.

FIELD OF TECHNOLOGY

The embodiments of the present application relate to the technical field of domain name information services, and more particularly, to a blockchain multi-party shared-governance-based system for maintaining domain name information.

BACKGROUND

At present, the Internet has been deeply integrated into people's lives, with a huge scope of influence, and various upper-level applications are emerging one after another. The Domain Name System (DNS), as a basic service for resolving names and addresses of Internet resource, has become more and more important. Therefore, the security and stability of a root service system, as the DNS resolution portal, is a prerequisite for the normal and efficient operation of the entire domain name resolution business.

However, at present, the domain name root service system is centrally managed and maintained by ICANN and related agencies thereof, which leads to inefficient and inconvenient domain name application, maintenance and use to some extent. In addition, the hierarchical central management mode of the DNS system presents deficiencies in fairness and stability, as well as the most important issue, that is security risks, such as DDoS and DNS cache pollution. Since all data is stored centrally on the central server, it is very likely that the domain name holder or even the entire system will suffer losses due to operational errors or attacks on the domain name information without the assistance or regulation of a second equivalent agency. In the process of implementing the embodiments of the present application, the inventor has found that in the traditional DNS service system adopting a centralized maintenance method, the normal operation of the entire system will be affected and the system has low stability and security once the central server is attacked or operated incorrectly.

SUMMARY

The technical problem to be solved by the present application is how to address the emerging disadvantages of the centralized maintenance of a traditional DNS service system, since the normal operation of the entire system will be affected and the stability and security of the system are therefore lower once the central server is attacked or operated incorrectly.

In order to solve the technical problem above, embodiments of the present application provide a blockchain multi-party shared-governance-based system for maintaining domain name information, including: a Root blockchain, formed by first network nodes where top-level domain registries are located;

collecting, by each authoritative node among the first network nodes, domain name operation information from each first network node, and packing the collected domain name operation information to obtain first block information;

broadcasting, by a first authoritative node, the first block information to each second authoritative node, receiving verification result on the first block information sent by each second authoritative node, and broadcasting the first block information to each first network node to execute the domain name operation information in the first block information at each first network node in the Root blockchain when the number of authoritative nodes by which the verification of the first block information passes exceeds a first preset threshold;

wherein, each authoritative node among the first network nodes is reviewed and determined by a preset review mechanism, and the authoritative nodes in the Root blockchain includes a first authoritative node and a plurality of second authoritative nodes.

Provided by embodiments of the present application is a blockchain multi-party shared-governance-based system for maintaining domain name information, wherein a Root blockchain is formed by first network nodes where respective top-level domain registries are located, and domain name operation information needs to be confirmed by authoritative nodes among the first network nodes through a consensus process. Since the authoritative nodes are selected from the first network nodes, each network node in the Root blockchain in the system participates in the consensus process for the domain name operation information. Through such a decentralized method for maintaining domain name information, the final state will not be affected by a mistake or an attack on one network node, resulting in higher security and better stability of the entire system compared to the centralized maintenance method. Furthermore, each first network node in the Root blockchain stores all the domain name operation information to prevent malicious tampering, and a reliable data source is provided for update of domain names.

BRIEF DESCRIPTION OF THE DRAWINGS

In order to more clearly illustrate the technical solutions in the embodiments of the present application or in the prior art, drawings needed in the embodiments or the description of the prior art will be briefly introduced as follows. Obviously, the drawings in the following description are only some of the embodiments of the present application. For those of ordinary skill in the art, other drawings can be obtained based on these drawings without paying any creative effort.

DETAILED DESCRIPTION

In order to make the objectives, technical solutions and advantages of the embodiments of the present application clearer, the technical solutions in the embodiments of the present application will be described clearly and completely in conjunction with the accompanying drawings in the embodiments of the present application. Obviously, the embodiments described are part of the embodiments of the present application, rather than all of the embodiments. Based on the embodiments in the present application, all other embodiments obtained by those of ordinary skill in the art without creative effort shall fall within the protection scope of the present application.

Before introducing the method according to the present embodiment, the blockchain is introduced as follows: blockchain technology is the convergence of P2P network, distributed system, encryption technology and database technology. Blockchain is essentially a distributed database that records a list of all historical transaction records. These transaction records are generated and stored in a block unit and connected end to end in chronological order to form a chain of connected blocks, i.e., blockchain. In a blockchain system, each node participates in generation, verification, and storage of blocks according to different roles permissions, that is, various nodes jointly maintain the operation of the entire system. When a new block is generated, each node competes for a bookkeeping node which broadcasts the packed new block to all nodes in the entire network, and then usually needs to be confirmed by the majority of nodes in the entire network (determined by a consensus mechanism). Each node reaches an agreement on the content of the new block through the consensus mechanism (PoW, PoS, PBFT, etc.) preset by the system. Once the content in the block is confirmed by the node to be written into the blockchain, it cannot be tampered or erased, and can only be read and queried. This is because each block contains the hash value of the previous block, and each block is interlocked with each other in such a way that the subsequent block contains the hash value of the previous block, so that the data in the blockchain cannot be tampered by means of the characteristics of hash value.

Figure 1:
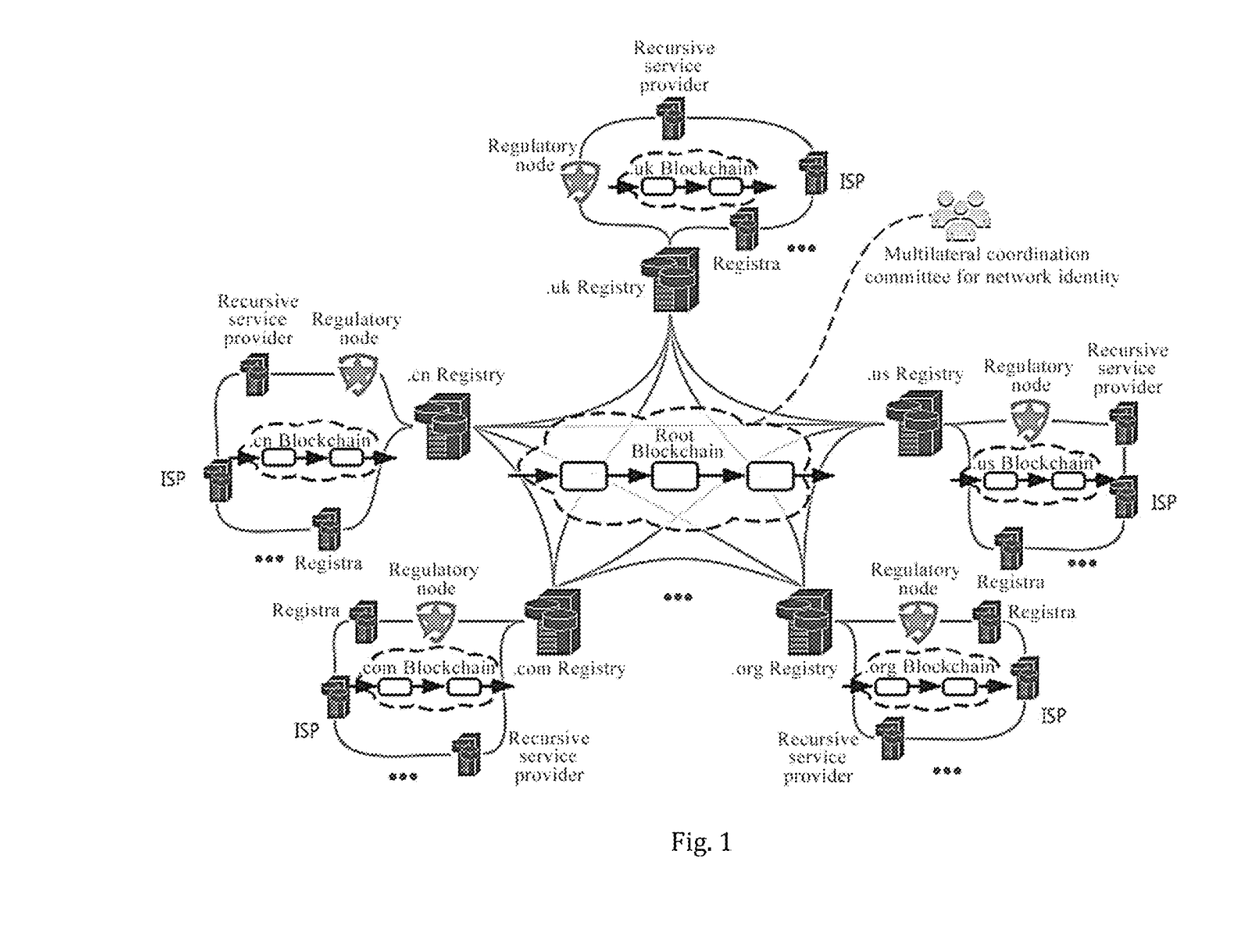
FIG. 1 is a schematic structural diagram of a blockchain multi-party shared-governance-based system for maintaining domain name information according to an embodiment of the present application.

FIG. 1 is a schematic structural diagram of a blockchain multi-party shared-governance-based system for maintaining domain name information according to this embodiment. As shown in FIG. 1, the system includes: a Root blockchain, formed by first network nodes where top-level domain registries are located;

collecting, by each authoritative node among the first network nodes, domain name operation information from each first network node, and packing the collected domain name operation information to obtain first block information;

broadcasting, by a first authoritative node, the first block information to each second authoritative node, receiving verification result on the first block information sent by each second authoritative node, and broadcasting the first block information to each first network node to execute the domain name operation information in the first block information at each first network node in the Root blockchain when the number of authoritative nodes by which the verification of the first block information passes exceeds a first preset threshold;

wherein, each authoritative node among the first network nodes is reviewed and determined by a preset review mechanism, and the authoritative nodes in the Root blockchain includes a first authoritative node and a plurality of second authoritative nodes.

As shown in FIG. 1, the first network node is the network node where the top-level domain registries are located. The top-level domain registries include registries of international generic top-level domains (for example, .com registry), and registries of country code top-level domains (for example, .cn registry, .org registry, .us registry and .uk registry). The information of the top-level domain is maintained by the Root blockchain. The generated domain name operation information may be executed after being confirmed by the authoritative nodes in the Root blockchain when the top-level domain is added, deleted, modified, and checked. In this system, the domain name information maintenance is decentralized by applying blockchain technology to the maintenance of domain name information, and the low security and poor stability that exist in traditional centralized maintenance methods are avoided.

In the Root blockchain, the same authoritative node lists are maintained at each block height. The authoritative nodes of the Root blockchain are nodes selected from various first network nodes of the Root blockchain, and the authoritative nodes participate in the consensus process of verifying the first block information generated from the domain name operation information. For example, a process of selecting authoritative nodes at each block height includes: scoring each first network node in the Root blockchain based on a preset review mechanism, and taking the K first network nodes with scores in the top K as the authoritative nodes according to a descending order. In an embodiment, the preset review mechanism may include: the longer a network node is added to the Root blockchain, the higher the score, or the more number of times the block information is verified correctly, the higher the score, etc., which is not specifically defined by this embodiment.

In the consensus process, the first block information is broadcasted to each second authoritative node by the first authoritative node among the authoritative nodes, and the first block information is verified by each authoritative node. When the number of authoritative nodes by which the verification passes exceeds a first preset threshold, it indicates that the first block information is successfully verified and can be executed at each first network node, that is, the domain name information stored by each first network node is synchronized according to the first block information. Further, the first preset threshold is ½ or ⅔ of the total number of authoritative nodes at the current block height of the Root blockchain.

Provided by this embodiment is a blockchain multi-party shared-governance-based system for maintaining domain name information, wherein a Root blockchain is formed by first network nodes where respective top-level domain registries are located, and domain name operation information needs to be confirmed by authoritative nodes among the first network nodes through a consensus process. Since the authoritative nodes are selected from the first network nodes, each network node in the Root blockchain in the system participates in the consensus process for the domain name operation information. Through such a decentralized method for maintaining domain name information, the final state will not be affected by a mistake or an attack on one network node, resulting in higher security and better stability of the entire system compared to the centralized maintenance method. Furthermore, each first network node in the Root blockchain stores all the domain name operation information to prevent malicious tampering and DDoS attack, and a highly reliable and available data source is provided for update of domain names.

In an embodiment, on the basis of the foregoing embodiment, the system further includes: at least one TLD blockchain, formed by second network nodes where top-level domain registries of a certain first top-level domain are located or organizations in the first top-level domain are located;

collecting, by each authoritative node among the second network nodes, operation information of subdomain information of the first top-level domain from each second network node, and packing the collected operation information of subdomain information to obtain second block information;

broadcasting, by a third authoritative node, the second block information to each fourth authoritative node, receiving verification result on the second block information sent by each fourth authoritative node, and broadcasting the second block information to each second network node to execute the operation information of subdomain information in the second block information at each second network node in the TLD blockchain when the number of authoritative nodes by which the verification of the second block information passes exceeds a second preset threshold;

wherein, each authoritative node among the second network nodes is reviewed and determined by a preset review mechanism, and the authoritative nodes in the TLD blockchain includes a third authoritative node and a plurality of fourth authority nodes.

As shown in FIG. 1, in addition to the Root blockchain for maintaining domain name information of top-level domains, a TLD blockchain for maintaining subdomain information of a certain type of top-level domains is also included in the system according to this embodiment. The subdomain information of a certain type of top-level domains is maintained by each TLD blockchain, for example, the .com blockchain for maintaining the subdomain information of the top-level domain of .com, the .cn blockchain for maintaining the subdomain information of the top-level domain of .cn, the .org blockchain for maintaining the subdomain information of the top-level domain of .org, the .us blockchain for maintaining the subdomain information of the top-level domain of .us, and the .uk blockchain for maintaining the subdomain information of the top-level domain of .uk.

Network nodes of each TLD blockchain include network nodes where the top-level domain registries of a first top-level domain are located (for example, the network nodes where the .uk registries are located) and the network nodes where the organizations in the first top-level domain are located (for example, the network nodes where respective registrars are located within the top-level domain of .uk, the network nodes where respective Internet service provider ISP are located, the network nodes where respective recursive service provider are located, and the regulatory nodes).

Similar to the consensus process of Root blockchain, in each TLD blockchain, the same authoritative node lists are maintained at each block height. The authoritative nodes of the TLD blockchain are nodes selected from various second network nodes of the TLD blockchain, and the authoritative nodes participate in the consensus process of verifying the second block information generated from the operation information of subdomain information. For example, a process of selecting authoritative nodes at each block height includes: scoring each second network node in the TLD blockchain based on a preset review mechanism, and taking the K second network nodes with scores in the top K as the authoritative nodes according to a descending order. In an embodiment, the preset review mechanism may include: the longer a network node is added to the TLD blockchain, the higher the score, or the more number of times the block information is verified correctly, the higher the score, which is not specifically defined by this embodiment.

In the consensus process, the second block information is broadcasted to each fourth authoritative node by the third authoritative node among the authoritative nodes, and the second block information is verified by each authoritative node. When the number of authoritative nodes by which the verification passes exceeds a second preset threshold, it indicates that the second block information is successfully verified and can be executed at each second network node, that is, the subdomain information of the first top-level domain stored by each second network node is synchronized according to the second block information. Further, the second preset threshold is ½ or ⅔ of the total number of authoritative nodes at the current block height of the TLD blockchain.

Provided by this embodiment is a blockchain multi-party shared-governance-based system for maintaining domain name information. In addition to the maintenance of top-level domain information through the Root blockchain, the subdomain information of a certain top-level domain is also maintained through the TLD blockchain under a certain top-level domain. The subdomain information of a certain top-level domain is maintained by the consensus process of the authoritative nodes in the TLD blockchain, and through such a decentralized method for maintaining domain name information, the impact on the entire system caused by attacks or operational errors on one network node is avoided, which not only improves the security and stability of subdomain information maintenance, but also prevents subdomain information from being maliciously tampered.

For both Root and TLD blockchains, similar consensus processes (for example, the PoA consensus mechanism) are used. Specifically, nodes in the blockchain are divided into two kinds: authoritative nodes and normal nodes. Authoritative nodes can pack blocks and verify the signatures of the blocks, and participate in the consensus process, while normal nodes are only entitled to sign and forward. Authoritative nodes and ordinary nodes can be interchanged, and a randomly selected domain name management organization serves as the initial authoritative node. When a new node is added in the future, it will firstly serve as a backup node, and may be promoted to an authoritative node after a period of indicator review. The promotion process is completed by the multilateral coordination committee for network identity which coordinates all parties to vote. Authoritative nodes may also be downgraded to normal nodes or even removed if they are confirmed to have malicious act.

Figure 2:
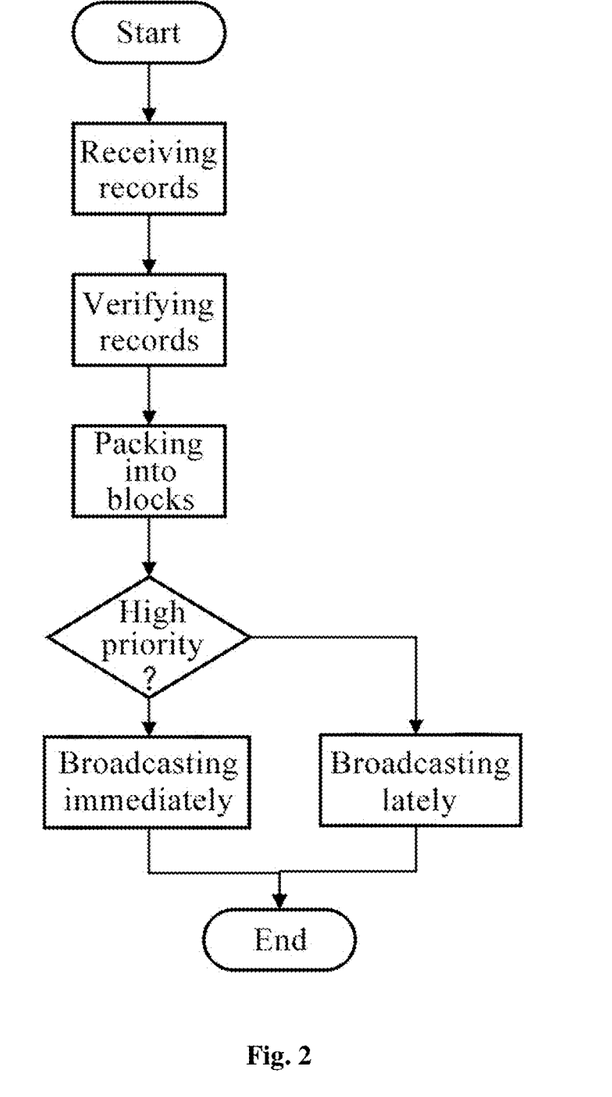
FIG. 2 is a schematic flowchart showing a block-producing process of an authoritative node according to another embodiment of the present application.

The consensus process of authoritative nodes includes the following steps: (a) determining the authoritative node with the highest priority through MOD operation; (b) when each block is being generated, collecting records by each authoritative node, simulating the execution of domain name operation records over a period of time, determining the reliability and legitimacy of the source of each record, and marking abnormal records; (c) after the node verification record is completed, packing the record into a block to generate relevant block information, including recording and storing the Merkle tree root; (d) nodes with high priority having the right to produce blocks firstly and broadcasting the newly generated blocks, while nodes with low priority having to wait for a period of time to broadcast blocks. If the nodes with high priority cannot produce blocks in time, the other secondary nodes are not entitled to broadcast blocks until N seconds later to continue the consensus process. Wherein, FIG. 2 is a schematic flowchart showing a block-producing process of an authoritative node according to this embodiment. As shown is FIG. 2, after packing the record information collected from each network node, the authoritative node will directly produce blocks (broadcast immediately) if it is the authoritative node with highest priority, otherwise, it can only produce blocks (broadcast with delay) after a period of time since the authoritative node with highest priority produce blocks.

Figure 3:
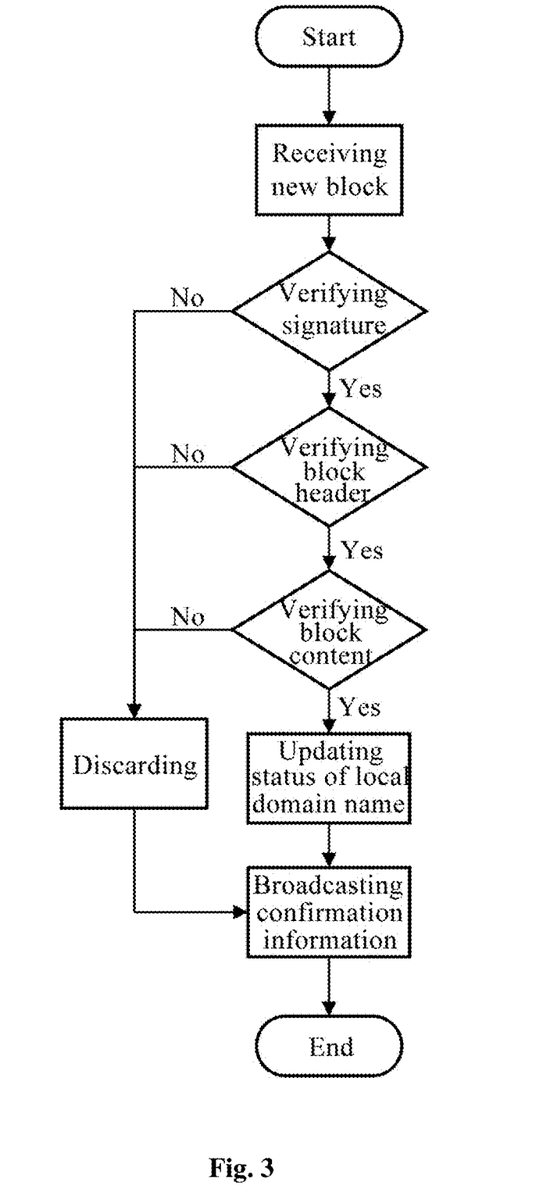
FIG. 3 is a schematic flowchart of verification of a block by an authoritative node according to yet another embodiment of the present application.

In the consensus process, the block information needs to be verified by the authoritative node that receives the block information. The verification process includes: (a) verifying, by all consensus nodes, the block signature, block header, and block content after receiving the new block, and discarding the illegal blocks; (b) receiving verification of this block from other nodes, determining the block to be legitimate if the block is confirmed by more than ½ of the nodes in the entire network, then adding the block into the blockchain, executing the operation records in the block, and maintaining the consistent domain name information status of each node. In an embodiment, FIG. 3 is a schematic flowchart of verification of a block by an authoritative node according to this embodiment. As shown in FIG. 3, after receiving the block information, the authoritative node verifies the signature, block header, and block content of the block information. As long as there is content that fails in the verification, the block is discarded, otherwise, the block information is successfully verified, and the verification result is broadcast to other network nodes in the blockchain. Table 1 shows the block header data structure, and Table 2 shows the domain name record data structure.

TABLE 1

Block Header Data Structure

| Field name | Field length | Description |
| --- | --- | --- |
| Version number | 4 bytes | Used to distinguish block versions |
| Previous block hash | 32 bytes | Hash value of the previous block |
| Packing node | 32 bytes | ID of node responsible for producing blocks |
| Recorded Merkle root | 32 bytes | Merkle tree root value recorded by domain name operation |
| Stored Merkle root | 32 bytes | Merkle tree root value stored by domain name operation |
| Timestamp | 4 bytes | Standard time for the block being verified |
| Node operation instruction | 1 byte | Add/exit information of nodes in the chain |

TABLE 2

Domain Name Record Data Structure

| Field name | Field length | Description |
| --- | --- | --- |
| Record attributes | 4 bytes | Root domain or top-level domain |
| Domain name operation type | 4 bytes | Register/update/delete etc. |
| Modified content | 256 bytes | New content |
| Postscript | 128 bytes | Additional information |
| Operator public key | 128 bytes | Issue the signature of modified recording node |
| Timestamp | 4 bytes | Standard time when the record is issued |

In an embodiment, as for the consensus process in the Root blockchain, on the basis of the foregoing embodiments, the broadcasting, by a first authoritative node, the first block information to each second authoritative node, receiving verification result on the first block information sent by each second authoritative node, and broadcasting the first block information to each first network node when the number of authoritative nodes by which the verification of the first block information passes exceeds a first preset threshold includes:

broadcasting, by the first authoritative node with the highest priority among the authoritative nodes in the Root blockchain, the first block information to each second authoritative node, receiving verification result on the first block information sent by each second authoritative node, and broadcasting the first block information to each first network node when the number of authoritative nodes by which the verification of the first block information passes exceeds a first preset threshold;

after a first preset period of time elapses since broadcasting the first block information to each second authoritative node by the first authoritative node, broadcasting, by each second authoritative node, the first block information to each authoritative node in the Root blockchain, receiving verification result on the first block information sent by each authoritative node in the Root blockchain, and broadcasting the first block information to each first network node when the number of authoritative nodes by which the verification of the first block information passes exceeds the first preset threshold;

wherein the same list of authoritative nodes are maintained at the same block height in the Root blockchain.

In an embodiment, the first authoritative node with the highest priority among the authoritative nodes of the Root blockchain is selected by the MOD operation. It needs to be ensured that each authoritative node has the same probability to be selected through the algorithm for selecting the first authoritative node with the highest priority, which is not defined in this embodiment. For example, MOD operation is performed on the current Root blockchain's block height and the total number of authoritative nodes to obtain the calculation result, and the authoritative node whose number is equal to the calculation result will be determined as the first authoritative node with the highest priority. The first preset period of time is, for example, 2 s.

In an embodiment, as for the consensus process in the TLD blockchain, on the basis of the foregoing embodiments, the broadcasting, by a third authoritative node, the second block information to each fourth authoritative node, receiving verification result on the second block information sent by each fourth authoritative node, and broadcasting the second block information to each second network node when the number of authoritative nodes by which the verification of the second block information passes exceeds a second preset threshold includes:

broadcasting, by the third authoritative node with the highest priority among the authoritative nodes in the TLD blockchain, the second block information to each fourth authoritative node, receiving verification result on the second block information sent by each fourth authoritative node, and broadcasting the second block information to each second network node when the number of authoritative nodes by which the verification of the second block information passes exceeds a second preset threshold;

after a second preset period of time elapses since broadcasting, by the third authoritative node, the second block information to each fourth authoritative node, broadcasting, by each fourth authoritative node, the second block information to each authoritative node in the TLD blockchain, receiving verification result on the second block information sent by each authoritative node in the TLD blockchain, and broadcasting the second block information to each second network node when the number of authoritative nodes by which the verification of the second block information passes exceeds the second preset threshold;

wherein the same list of authoritative nodes is maintained at the same block height in the TLD blockchain.

In an embodiment, the third authoritative node with the highest priority among the authoritative nodes of the TLD blockchain is selected by the MOD operation. It needs to be ensured that each authoritative node has the same probability to be selected through the algorithm for selecting the third authoritative node with the highest priority, which is not defined in this embodiment. For example, MOD operation is performed on the current TLD blockchain's block height and the total number of authoritative nodes to obtain the calculation result, and the authoritative node whose number is equal to the calculation result will be determined as the third authoritative node with the highest priority. The second preset period of time is, for example, 2 s.

Provided by this embodiment is a blockchain multi-party shared-governance-based system for maintaining domain name information, wherein during the consensus process, the authoritative node with the highest priority produces blocks firstly, and then the remaining authoritative nodes produce blocks after a period of time. Through this consensus mechanism, the inability to verify the block information caused when the authoritative node with the highest priority cannot produce blocks is prevented, thereby maintaining the stability of the system.

The block information is synchronized at each network node after being confirmed by means of the consensus process. The Root blockchain corresponds to the Root zone file, and a Root zone file is jointly maintained by the registries as the chained nodes. Similarly, a TLD zone file is jointly maintained by the nodes in each TLD blockchain. The maintenance and update of files in each zone are synchronized in real time based on the domain name operation records in each block in the blockchain. If there may still be information inconsistencies caused by delays, the participants are assisted in keeping consistency in the state of the domain by setting a checkpoint every period of time. The zone file generated by the blockchain serves as a trusted source of domain name information to provide reliable service information for the application layer. Therefore, the existing user-and-application-oriented domain name business logic of the system has not been changed, and the role of the blockchain is only to generate corresponding zone files.

In order to regulate the nodes and transmitted data in the blockchain, the nodes where the multilateral coordination committee for network identity is located are provided in the Root block, and the regulatory nodes are provided in the TLD blockchain. FIG. 1 shows the coordinator nodes where the multilateral coordination committee for network identity is located in the Root blockchain. The coordinator node has the role of dominating the voting process on authoritative nodes, regulating each first network node of the Root blockchain, regulating the existence of anomalies in block information, receiving complaints about a network node and the like. The multilateral coordination committee for network identity plays a neutral role in the Root blockchain. When the participants cannot reach agreement at the system level or the system fails, the participants can re-reach an agreement to maintain the system to resume operation through the coordination of the neutral role. A regulatory node is added to the TLD blockchain to synchronize domain name data in the blockchain, and regulate the domain name system according to the policies and laws of each domain.

In an embodiment, as for the Root blockchain, on the basis of the foregoing embodiments, the Root blockchain further includes a coordinator node, which is the first network node where the multilateral coordination committee for network identity is located in the Root blockchain;

broadcasting, by the coordinator node, to each first network node to review a first trouble node when the presence of the first trouble node in the Root blockchain is detected or a complaint about the presence of the first trouble node in the Root blockchain is received, receiving response result on whether to remove the first trouble node from the Root blockchain sent by each first network node, and removing the first trouble node from a node list of the Root blockchain by each first network node when the response result is that the number of first network nodes agreeing to remove the first trouble node from the Root blockchain exceeds a third preset threshold.

For the coordinator node, after detecting abnormal block information, the first trouble node can be determined from the abnormal block information, or can be determined directly based on the behavior of the network node, which is not specifically defined in this embodiment. The third preset threshold is ½ of the total number of first network nodes in the Root blockchain. In other words, the first trouble node is removed from the Root blockchain if the response result by more than half of the first network nodes is to remove the first trouble node from the Root blockchain.

In an embodiment, as for the Root blockchain, on the basis of the foregoing embodiments, the system further includes:

after any first network node receives the information of adding a first newly added node to the Root blockchain, broadcasting the first newly added node to each first network node in the Root blockchain, receiving voting result on whether to add the first newly added node to the Root blockchain sent by each first network node, and adding the first newly added node to a node list of the Root blockchain by each first network node when the number of nodes agreeing to add the first newly added node to the Root blockchain exceeds a fourth preset threshold in the voting result.

The fourth preset threshold is ½ of the total number of first network nodes in the Root blockchain. In other words, the first newly added node is added to the Root blockchain if the voting result by more than half of the first network nodes is to add the first newly added node to the Root blockchain.

Provided by this embodiment is a blockchain multi-party shared-governance-based system for maintaining domain name information, wherein the removal and addition of network nodes in the Root blockchain must be determined through voting by each network node, which fully guarantees the security of adding nodes and the necessity of removing nodes, and maintains system security.

In an embodiment, as for the TLD blockchain, on the basis of the foregoing embodiments, the TLD blockchain further includes a second network node as a regulatory node;

broadcasting, by the regulatory node, to each second network node to review a second trouble node when the presence of the second trouble node in the TLD blockchain is detected or a complaint about the presence of the second trouble node in the TLD blockchain is received, receiving response result on whether to remove the second trouble node from the TLD blockchain sent by each second network node, and removing the second trouble node from a node list of the TLD blockchain by each second network node when the response result is that the number of second network nodes agreeing to remove the second trouble node from the TLD blockchain exceeds a fifth preset threshold.

For the regulatory node, after detecting abnormal block information, the second trouble node can be determined from the abnormal block information, or can be determined directly based on the behavior of the network node, which is not specifically defined in this embodiment. The fifth preset threshold is ½ of the total number of second network nodes in the TLD blockchain. In other words, the second trouble node is removed from the TLD blockchain if the response result by more than half of the second network nodes is to remove the second trouble node from the TLD blockchain.

In an embodiment, as for the TLD blockchain, on the basis of the foregoing embodiments, the system further includes:

after any second network node receives the information of adding a second newly added node to the TLD blockchain, broadcasting the second newly added node to each second network node in the TLD blockchain, receiving voting result on whether to add the second newly added node to the TLD blockchain sent by each second network node, and adding the second newly added node to a node list of the TLD blockchain by each second network node when the number of nodes agreeing to add the second newly added node to the TLD blockchain exceeds a sixth preset threshold in the voting result.

The six preset threshold is ½ of the total number of second network nodes in the TLD blockchain. In other words, the second newly added node is added to the TLD blockchain if the voting result by more than half of the second network nodes is to add the second newly added node to the TLD blockchain.

Provided by this embodiment is a blockchain multi-party shared-governance-based system for maintaining domain name information, wherein the removal and addition of network nodes in the TLD blockchain must be determined through voting by each network node, which fully guarantees the security of adding nodes and the necessity of removing nodes, and maintains system security.

Specifically, the TLD blockchain has many participants with low authority, so the removal of trouble nodes added in each TLD blockchain is also based on voting ideas, and voting is mainly dominated by the regulatory node. The regulatory node tracks the status of each node and the information status in the blockchain in real time. If a certain number of nodes complain the information in the past period of time, the regulatory node coordinates each node to initiate a vote to remove the trouble node, overwrite and repair past trouble records. The process of removing the trouble node by the regulatory node includes: (1) when the regulatory node itself finds an abnormality in the process of synchronizing records in the blockchain, or receives a certain number of complaint requests from chained nodes against the same trouble node, the regulatory node will start to lead the problem node review process; (2) after receiving the broadcast from the regulatory node, each node checks the authentication message of the trouble node and the corresponding domain name operation records; if the trouble node has participated in a consensus process, it further checks the records in the relevant block and review the block generated by the trouble node; each node returns to a response of removal- or -not according to their respective review results; (3) each node receives the responses of removal- or -not sent by other nodes; if the number of responses agreeing to remove the trouble node exceeds half of the nodes in the entire network, the trouble node will be removed from the node list, and the regulatory node is waited to maintain information in the blockchain; and (4) the regulatory node also receives the responses of removal- or -not about the trouble node; if the trouble node is removed and the malicious behavior of the trouble node has affected the information in the blockchain, the regulatory node will mark the relevant records in the blockchain and collect all problematic records regarding the trouble block, coordinate state rollback for each node, and repackage records into blocks.

The process of adding a newly added node to the blockchain includes: (1) the new node generates a node ID, sends an add request to any chained node, and commits relevant authentication information, including the unique identification or signature of the registry and registrar, etc. through the chained node; (2) after receiving the request message from the new node, the chained node broadcasts the authentication message of the new node to each of other nodes via the underlying network; (3) the chained nodes that have received the authentication message of the new node will review and authenticate the message, check the integrity and authenticity of the information, and broadcast the authentication result to other nodes (agree or object); and (4) the new node is added to the node list if each chained node receives more than half of the agreement information from other chained nodes, and the adding process is completed.

In an embodiment, on the basis of the foregoing embodiments, each first network node in the Root blockchain is within the TLD blockchain, and is the second network node where the top-level domain registry is located in the TLD blockchain.

As shown in FIG. 1, the entire system includes one Root blockchain, and the top-level domain registries of each top-level domain of the Root blockchain is within the TLD blockchain of the top-level domain. In other words, the root domain name structure, following the hierarchical idea, is mainly composed of two levels of chains: one is the Root blockchain composed of various top-level domain (TLD) registries, maintaining the Hint record of the root zone; the other is the TLD blockchain composed of top-level domain registries and their domain registrars, ISPs, etc., maintaining their corresponding TLD records. Each top-level domain maintains its subdomain information through the TLD blockchain, which fully realizes decentralization and ensures the fairness, security and stability of the system.

In an embodiment, on the basis of the foregoing embodiments, the system further includes:

after the domain name operation information in the first block information is executed at each first network node in the Root blockchain, broadcasting updated domain name information of the second top-level domain to each second network node in the TLD blockchain where the first network nodes corresponding to the second top-level domain are located when the first network node corresponding to the second top-level domain detects that the domain name information of the second top-level domain is updated, to synchronize the updated domain name information of the second top-level domain at each second network nodes of the TLD blockchain.

The Root blockchain and each TLD blockchain are associated through the network node where the common top-level domain registries are located. The TLD blockchain maintains the subdomain information of a certain top-level domain, and the change of the top-level domain name information is synchronized to the Root blockchain through the network node where the top-level domain registry is located when the change of the subdomain information involves the change of the top-level domain name information. Correspondingly, when the Root blockchain makes a change in top-level domain name information, if a network node where a top-level domain registry is located detects the change of the top-level domain name information, the change of the domain name information will be synchronized in the TLD blockchain where the network node of the top-level domain registry is located, so as to realize the unification of the domain name information of the entire system and ensure the reliability of the provided domain name data.

Provided by this embodiment is a blockchain multi-party shared-governance-based system for maintaining domain name information, wherein the maintenance features of the hierarchical architecture continues to be used according to the hierarchical design to achieve decentralization within the hierarchy. The consortium blockchain is employed to record domain name operations to provide a source of trust for generating zone files. Each node in the blockchain participates in the maintenance of the domain name through voting without any centralized node having privileges, and multiple parties coordinate for shared-governance. The multilateral coordination committee for network identity and regulatory nodes are added to the blockchain, and TLDs can be autonomous and controllable according to their respective management policies and needs.

Finally, it should be noted that the embodiments above are only for illustrating the technical solutions of the present application, rather than limiting them; although the present application has been described in detail with reference to the foregoing embodiments, those skilled in the art should understand that the technical solutions documented in the preceding embodiments may still be modified, or parts or all of the technical features thereof can be equivalently substituted; and such modifications or substitutions do not deviate from scope of the technical solutions of the embodiments of the present application.

The invention claimed is:

1. A blockchain multi-party shared-governance-based system for maintaining domain name information, comprising:
   a Root blockchain formed by first network nodes where top-level domain registries are located, and used to maintain information of a top-level domain; wherein the top-level domain registries comprise registries of international generic top-levels and registries of country code top-level domains;
   wherein the blockchain multi-party shared-governance-based system comprises a computing device configured to:
   collect, by each authoritative node among the first network nodes, domain name operation information from each first network node, and pack the collected domain name operation information to obtain first block information; wherein the authoritative node is selected from the first network nodes of the Root blockchain, and the authoritative node participates in a consensus process of verifying the first block information generated from the domain name operation information; and
   broadcast, by a first authoritative node, the first block information to each second authoritative node, receive a verification result on the first block information sent by each second authoritative node, and broadcast the first block information to each first network node to execute the domain name operation information in the first block information at each first network node in the Root blockchain in response to determining that a number of authoritative nodes by which the verification result of the first block information passes exceeds a first preset threshold;
   wherein, each authoritative node among the first network nodes is reviewed and determined by a preset review mechanism, and the authoritative nodes in the Root blockchain comprises a first authoritative node and a plurality of second authoritative nodes; and
   at least one top-level domain (TLD) blockchain formed by second network nodes, wherein top-level domain registries of a certain first top-level domain are located or organizations in the first top-level domain are located, and used to maintain subdomain information of a certain type of top-level domains,
   wherein the blockchain multi-party shared-governance-based system is further configured to:
   collect, by each authoritative node among the second network nodes, operation information of subdomain information of the first top-level domain from each second network node, and pack the collected operation information of subdomain information to obtain second block information; and
   broadcast, by a third authoritative node, the second block information to each fourth authoritative node, receive a verification result on the second block information sent by each fourth authoritative node, and broadcast the second block information to each second network node to execute the operation information of subdomain information in the second block information at each second network node in the TLD blockchain in response to determining that the number of authoritative nodes by which the verification of the second block information passes exceeds a second preset threshold;
   wherein, each authoritative node among the second network nodes is reviewed and determined by a preset review mechanism, and the authoritative nodes in the TLD blockchain comprises a third authoritative node and a plurality of fourth authority nodes;
   wherein, the top-level domain registries of each top-level domain of the Root blockchain is within the TLD blockchain of the top-level domain; and the Root blockchain composed of various top-level domain (TLD) registries, maintains Hint record of a root zone; and the TLD blockchain composed of top-level domain registries and their domain registrars maintains corresponding TLD records.

2. The system of claim 1, wherein the broadcasting, by a first authoritative node, the first block information to each second authoritative node, receiving the verification result on the first block information sent by each second authoritative node, and broadcasting the first block information to each first network node in response to determining that the number of authoritative nodes by which the verification of the first block information passes exceeds a first preset threshold comprises:
   broadcasting, by the first authoritative node with the highest priority among various authoritative nodes in the Root blockchain, the first block information to each second authoritative node, receiving the verification result on the first block information sent by each second authoritative node, and broadcasting the first block information to each first network node in response to determining that the number of authoritative nodes by which the verification of the first block information passes exceeds the first preset threshold; and after a first preset period of time elapses since broadcasting the first block information to each second authoritative node by the first authoritative node, broadcasting, by each second authoritative node, the first block information to each authoritative node in the Root blockchain, receiving the verification result on the first block information sent by each authoritative node in the Root blockchain, and broadcasting the first block information to each first network node in response to determining that the number of authoritative nodes by which the verification of the first block information passes exceeds the first preset threshold;

wherein, the same list of authoritative nodes is maintained at the same block height in the Root blockchain.

3. The system of claim 1, wherein the broadcasting, by a third authoritative node, the second block information to each fourth authoritative node, receiving the verification result on the second block information sent by each fourth authoritative node, and broadcasting the second block information to each second network node in response to determining that the number of authoritative nodes by which the verification of the second block information passes exceeds a second preset threshold comprises:

broadcasting, by the third authoritative node with the highest priority among various authoritative nodes in the TLD blockchain, the second block information to each fourth authoritative node, receiving the verification result on the second block information sent by each fourth authoritative node, and broadcasting the second block information to each second network node in response to determining that the number of authoritative nodes by which the verification of the second block information passes exceeds the second preset threshold; and after a second preset period of time elapses since broadcasting the second block information to each fourth authoritative node by the third authoritative node, broadcasting, by each fourth authoritative node, the second block information to each authoritative node in the TLD blockchain, receiving the verification result on the second block information sent by each authoritative node in the TLD blockchain, and broadcasting the second block information to each second network node in response to determining that the number of authoritative nodes by which the verification of the second block information passes exceeds the second preset threshold;

wherein, the same list of authoritative nodes is maintained at the same block height in the TLD blockchain.

4. The system of claim 1, wherein the Root blockchain further comprises a coordinator node, the coordinator node being the first network node where multilateral coordination committee for network identity is located in the Root blockchain;

wherein the blockchain multi-party shared-governance-based system is further configured to:

broadcast, by the coordinator node, to each first network node to review a first trouble node in response to determining that the presence of the first trouble node in the Root blockchain is detected or a complaint about the presence of the first trouble node in the Root blockchain is received, receive response result on whether to remove the first trouble node from the Root blockchain sent by each first network node, and remove the first trouble node from a node list of the Root blockchain by each first network node in response to determining that the response result is that a number of first network nodes agreeing to remove the first trouble node from the Root blockchain exceeds a third preset threshold.

5. The system of claim 1, wherein the blockchain multi-party shared-governance-based system is further configured to:

after any first network node receives the information of adding a first newly added node to the Root blockchain, broadcast the first newly added node to each first network node in the Root blockchain, receive voting result on whether to add the first newly added node to the Root blockchain sent by each first network node, and add the first newly added node to a node list of the Root blockchain by each first network node in response to determining that a number of nodes agreeing to add the first newly added node to the Root blockchain exceeds a fourth preset threshold in the voting result.

6. The system of claim 1, wherein the TLD blockchain further comprises a second network node as a regulatory node;

wherein the blockchain multi-party shared-governance-based system is further configured to:

broadcast, by the regulatory node, to each second network node to review a second trouble node in response to determining that the presence of the second trouble node in the TLD blockchain is detected or a complaint about the presence of the second trouble node in the TLD blockchain is received, receive response result on whether to remove the second trouble node from the TLD blockchain sent by each second network node, and remove the second trouble node from a node list of the TLD blockchain by each second network node in response to determining that the response result is that a number of second network nodes agreeing to remove the second trouble node from the TLD blockchain exceeds a fifth preset threshold.

7. The system of claim 1, wherein the blockchain multi-party shared-governance-based system is further configured to:

after any second network node receives the information of adding a second newly added node to the TLD blockchain, broadcast the second newly added node to each second network node in the TLD blockchain, receive voting result on whether to add the second newly added node to the TLD blockchain sent by each second network node, and add the second newly added node to a node list of the TLD blockchain by each second network node in response to determining that a number of nodes agreeing to add the second newly added node to the TLD blockchain exceeds a sixth preset threshold in the voting result.

8. The system of claim 1, wherein each first network node in the Root blockchain is within the TLD blockchain, and is the second network node where a top-level domain registry is located in the TLD blockchain.

9. The system of claim 8, wherein the blockchain multi-party shared-governance-based system is further configured to:

after the domain name operation information in the first block information is executed at each first network node in the Root blockchain, broadcast updated domain name information of a second top-level domain to each second network node in the TLD blockchain where the first network nodes corresponding to the second top-level domain are located in response to determining that the first network node corresponding to the second top-level domain detects that the domain name information of the second top-level domain is updated, to synchronize the updated domain name information of the second top-level domain at each second network nodes of the TLD blockchain.

\* \* \* \* \*